(12) United States Patent
Paulson et al.

(10) Patent No.: US 11,565,800 B2
(45) Date of Patent: Jan. 31, 2023

(54) MULTI-PIECE ASSEMBLY FOR A TUBULAR COMPOSITE BODY

(71) Applicant: Bell Helicopter Textron Inc., Fort Worth, TX (US)

(72) Inventors: Jared Mark Paulson, Fort Worth, TX (US); Mark Mays, Bedford, TX (US); Michael Christopher Burnett, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 301 days.

(21) Appl. No.: 16/048,869

(22) Filed: Jul. 30, 2018

(65) Prior Publication Data

US 2020/0031086 A1 Jan. 30, 2020

(51) Int. Cl.
*B32B 1/08* (2006.01)
*B64C 27/473* (2006.01)
(Continued)

(52) U.S. Cl.
CPC .......... *B64C 27/473* (2013.01); *B29C 70/302* (2021.05); *B32B 1/08* (2013.01);
(Continued)

(58) Field of Classification Search
CPC ... B29C 66/7212; B29C 65/48; B29C 65/562; B29C 66/1162; B29C 66/14; B29C 66/301; B29C 66/54; B29C 66/543; B29C 66/547; B29C 66/73756; B29C 66/73941; B29C 70/30; B29C 70/302; B29D 23/00; B29K 2307/04; B29K 2309/08; B32B 1/08; B32B 27/08; B32B 2597/00; B32B 2603/00; B32B 2250/02; B32B 2262/101; B32B 2262/106; B32B 2605/18; B32B 3/02; B32B 5/02; B32B 5/26; B32B 7/05; B32B 7/08; B64C 2027/4736; B64C 27/473; B64C 3/185; B64C 11/26;
(Continued)

(56) References Cited

U.S. PATENT DOCUMENTS 4,169,749 A  * 10/1979 Clark ................. B29C 33/0016
                                                          156/156
6,264,877 B1 * 7/2001 Pallu De La Barriere .................
                                                          F03D 1/0675
                                                          264/516
(Continued)

*Primary Examiner* — Yan Lan
(74) *Attorney, Agent, or Firm* — Fogarty LLP

(57) ABSTRACT

Embodiments are directed to systems and methods for two or more cured composite assemblies that are bonded together to form a tubular composite structure, wherein each of the cured composite assemblies do not have a tubular shape. The tubular composite structure may form a spar for an aerodynamic component, for example. The two or more cured composite assemblies may comprise carbon or fiberglass composite materials or a combination of materials. Each of the cured composite assemblies may further comprise axial edges that are configured to be bonded to another of the cured composite assemblies, wherein the axial edges have a sloped shape. An adhesive agent may be applied on the axial edges for bonding two cured composite assemblies. Alternatively, or additionally, one or more fasteners may be used to attach the axial edges of at least two cured composite assemblies.

13 Claims, 4 Drawing Sheets

(51) Int. Cl.
    *B64C 3/18*     (2006.01)
    *B32B 27/08*     (2006.01)
    *B29C 70/30*     (2006.01)
    *B29D 23/00*     (2006.01)
    *B29L 31/08*     (2006.01)

(52) U.S. Cl.
    CPC .............. *B32B 27/08* (2013.01); *B64C 3/185* (2013.01); *B29D 23/00* (2013.01); *B29L 2031/082* (2013.01); *B32B 2597/00* (2013.01); *B32B 2603/00* (2013.01); *B64C 2027/4736* (2013.01); *Y10T 428/13* (2015.01); *Y10T 428/139* (2015.01)

(58) Field of Classification Search
    CPC ....... B29L 2031/082; B29L 2031/3085; Y02T 50/40; Y10T 428/13; Y10T 428/139
    See application file for complete search history.

(56) References Cited

U.S. PATENT DOCUMENTS

| | | |
|---|---|---|
| 10,005,242 B2 | 6/2018 | Measom et al. |
| 2014/0271215 A1* | 9/2014 | Measom ................ B23P 15/04 29/889.71 |
| 2015/0064013 A1* | 3/2015 | Measom ............... B64C 27/473 29/889.71 |
| 2016/0348642 A1* | 12/2016 | Hayden ................ B29C 70/342 |

* cited by examiner

MULTI-PIECE ASSEMBLY FOR A TUBULAR COMPOSITE BODY

BACKGROUND

Composite assemblies are created by laying up an assembly of uncured details and material. This typically consists of laying dry fabric layers ("plies") by hand to create a laminate stack. Resin is then applied to the dry plies after layup is complete. Alternatively, "wet" composite plies that have resin built in may be used in the layup. Composite fabrication usually involves some form of mold tool to shape the plies and resin. A mold tool is required to give the unformed resin/fiber combination its shape prior to and during cure. Once the layup is complete, the composite is cured. The cure can be accelerated by applying heat and pressure to the composite layup.

A composite assembly may be used as a structural member for an aircraft component, for example. These structural members are often referred to as a "spar," and they may extend the axial length of a structure to provide support against loads applied on the structure. In the case of an aerodynamic component, such as propellers, rotor blades, and wings, for example, the spar may support both the weight of the aerodynamic component and any aerodynamic loads applied to the aerodynamic component, such as lift and drag forces. The spar is the primary structural member or backbone of many aircraft components. Due to the tubular geometry of typical spars, it can be challenging to produce a spar that fully forms to the desired shape without wrinkles or other defects that arise due to the inherent trapping condition exhibited by non-symmetric shapes and woven composite materials.

In existing manufacturing processes, a spar may be formed using a composite preform that is cured prior to assembly with the other components of the structure, such as skin assemblies in the case of composite blades. During this curing process, an inflatable bladder may be disposed within the uncured spar and expanded to help compact the layers of preformed composite material and remove any excess air bubbles or other voids included in the preform as the spar is cured at an elevated temperature within a precision mold. Once cured, the other components or details of the composite assembly are assembled with the spar. For instance, in the case of a rotor blade, outer skins and a leading edge are assembled with the spar and then bonded in a subsequent curing process.

The process of laying up a spar as one single structure requires a lot of manipulation which can lead to defects during the manufacturing process. For example, when the plies in the layers are oriented at various angles, such as off-axis plies that overlie unidirectional, full-span plies, the difference can cause wrinkling and bunching of the layers during cure.

SUMMARY

Embodiments are directed to systems and methods for two or more cured composite assemblies that are bonded together to form a tubular composite structure, wherein each of the cured composite assemblies do not have a tubular shape. The tubular composite structure may form a spar for an aerodynamic component, for example. The two or more cured composite assemblies may comprise carbon or fiberglass materials or a combination of materials. Each of the cured composite assemblies may further comprise an axial edge that is configured to be bonded to another of the cured composite assemblies, wherein the axial edge has a sloped shape. An adhesive agent may be applied on the axial edge for bonding two cured composite assemblies. Alternatively, or additionally, one or more fasteners may be used to attach the axial edges of at least two cured composite assemblies.

One or more composite plies may be used to cover a seam where the two or more cured composite assemblies are bonded together. One or more composite plies may be wrapped around the two or more cured composite assemblies after they have been bonded together. The one or more composite plies wrapped around the two or more cured composite assemblies may be cured while the cured composite assemblies are bonded together.

An example method for manufacturing composite assemblies comprises laying up plies on molds for two or more composite assemblies, wherein each of the cured composite assemblies do not have a tubular shape, curing the two or more composite assemblies, and bonding the two or more cured composite assemblies together to form a tubular composite structure. The method may further comprise forming an axial edge having a sloped shape on the composite assemblies and mating the sloped axial edges together when bonding the two or more cured composite assemblies. The method may further comprise bonding the two or more cured composite assemblies together using an adhesive agent on an axial edge. The method may further comprise attaching at least two cured composite assemblies together using fasteners.

The method may further comprise applying one or more composite plies over a seam where the two or more cured composite assemblies are bonded together. The method may further comprise wrapping one or more composite plies around the two or more cured composite assemblies after they have been bonded together. The one or more composite plies wrapped around the two or more cured composite assemblies may be cured while the cured composite assemblies are bonded together. The tubular composite structure may form a spar for an aerodynamic component, for example. The two or more cured composite assemblies may comprise carbon, fiberglass, or other composite materials or a combination of materials.

BRIEF DESCRIPTION OF THE DRAWINGS

Figure 1:
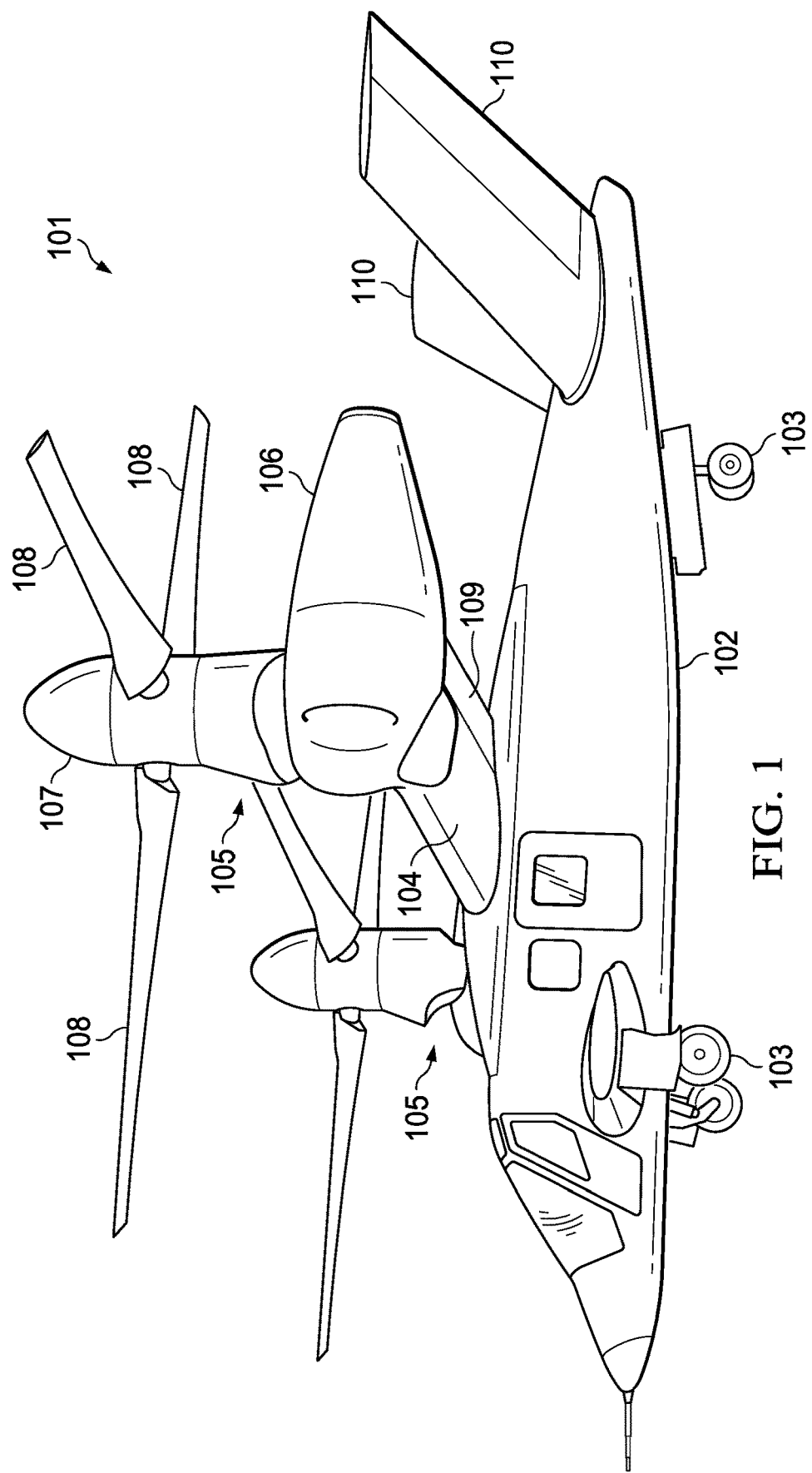

Having thus described the invention in general terms, reference will now be made to the accompanying drawings, which are not necessarily drawn to scale, and wherein:

FIG. 1 illustrates an example aircraft that can be used with certain embodiments of the disclosure.

Figure 2:
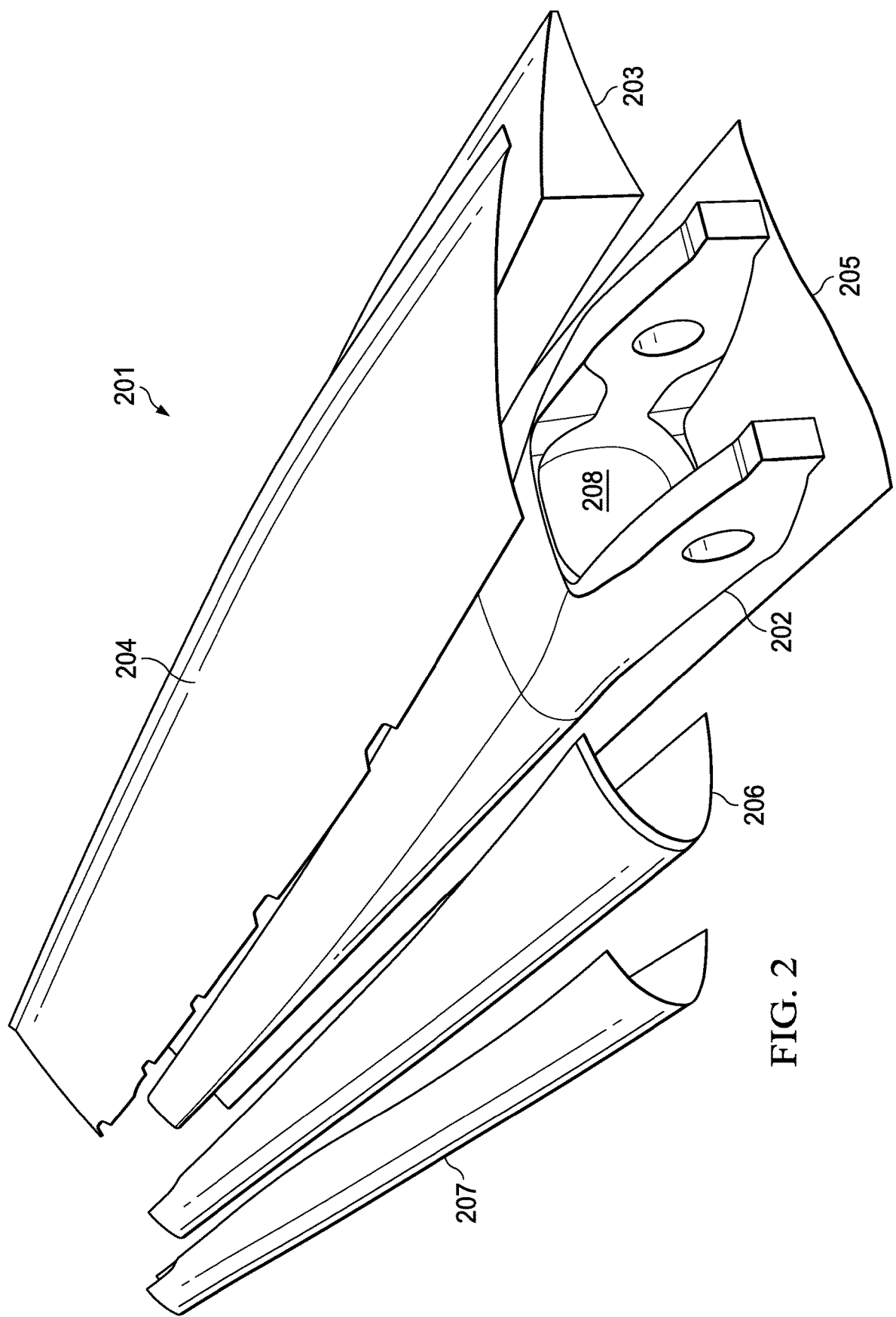

FIG. 2 is a perspective view of an exploded uncured composite assembly for use in one embodiment.

Figure 3A:
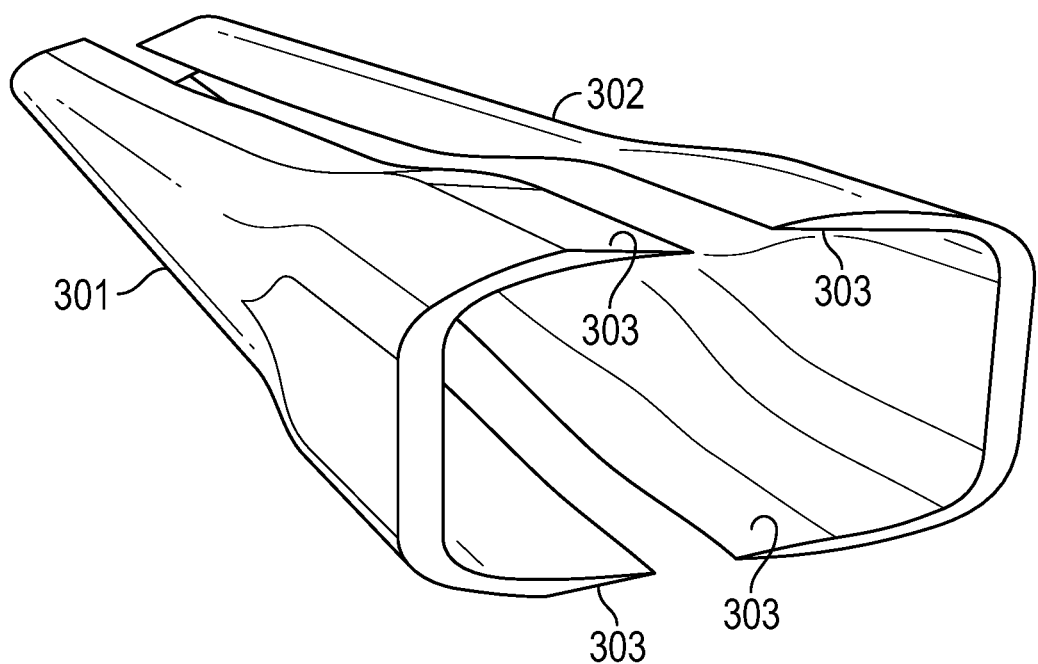

FIG. 3A illustrates two halves of a generally symmetrical tubular composite part.

Figure 3B:
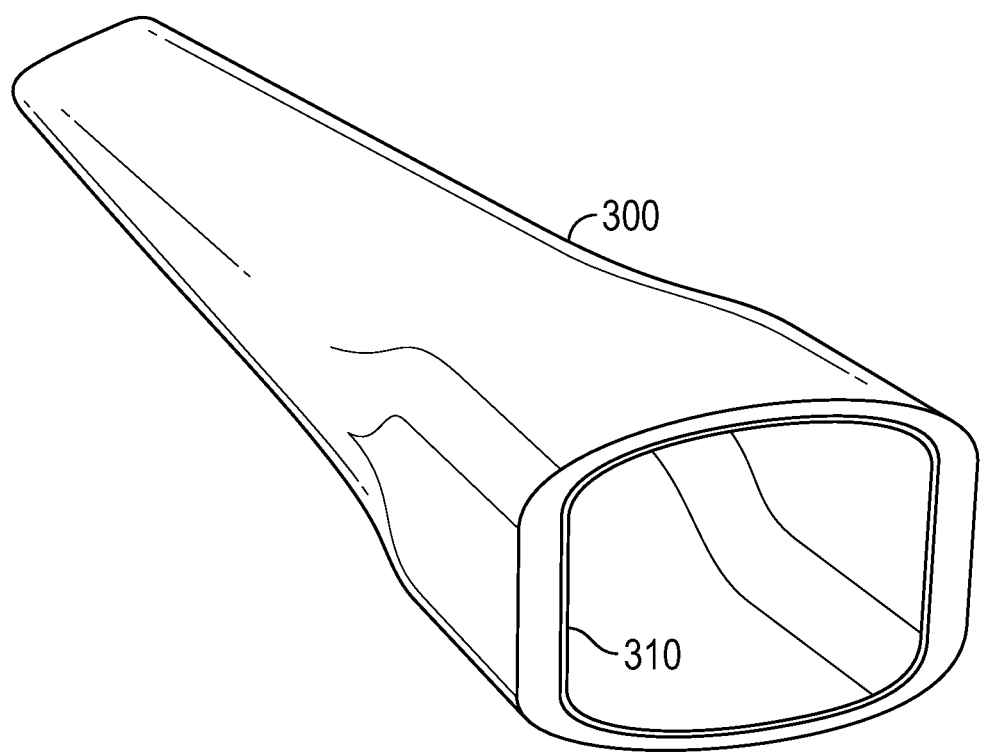

FIG. 3B illustrates a final tubular part once the halves shown in FIG. 3A have been bonded together.

Figure 4A:
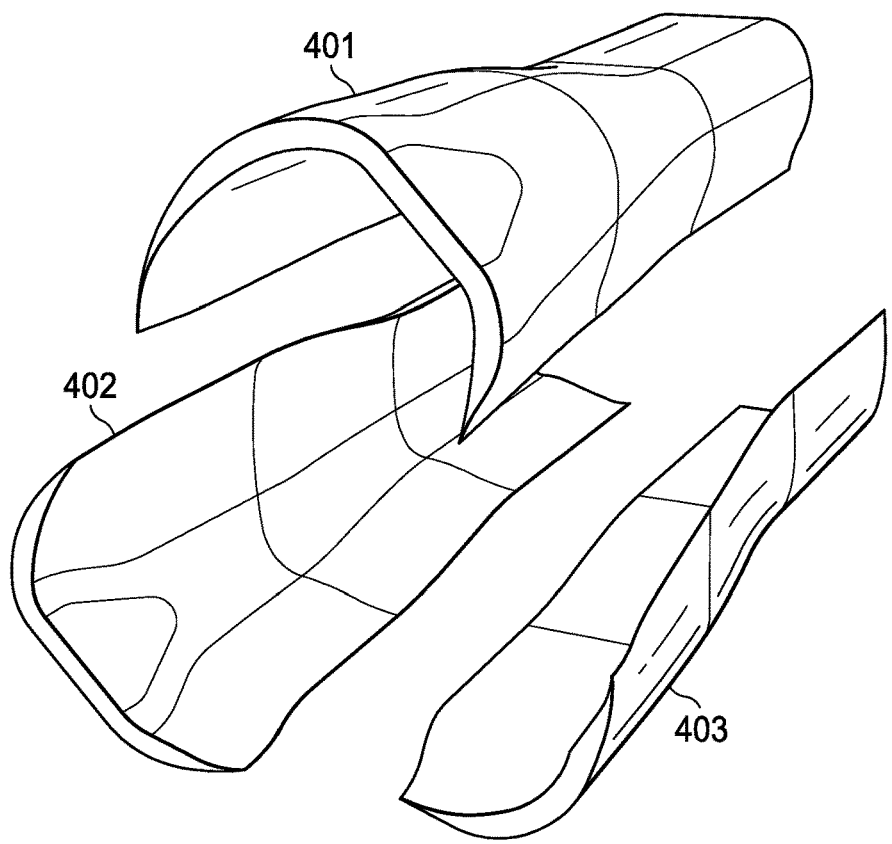

FIG. 4A illustrates multiple component assemblies of an asymmetrical tubular composite part.

Figure 4B:
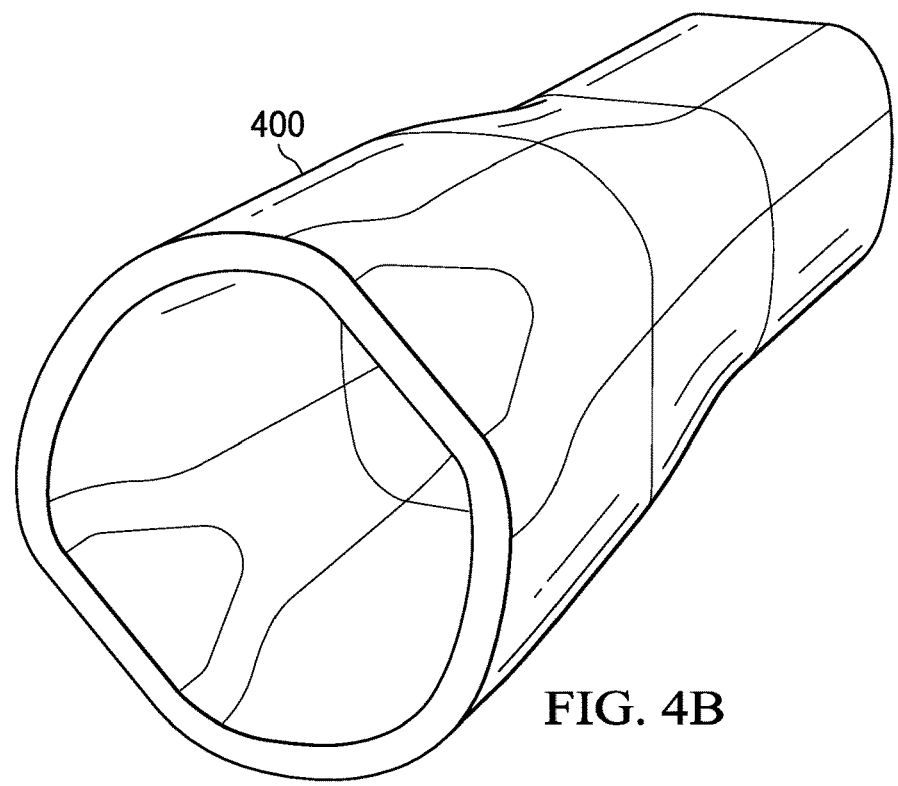

FIG. 4B illustrates a final tubular part once the component assemblies shown in FIG. 4A have been bonded together.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments are directed toward providing a high-quality composite part using a process that lowers the risk of manufacturing defects and reduces the manufacturing time. A tubular composite assembly may be laid up in pieces that are later combined, which provides both quality improvements and potential manufacture time reductions. This provides overall cost savings and allows for faster production rates.

FIG. 1. illustrates an aircraft 101. Certain embodiments of the disclosure may be used with an aircraft, such as aircraft 101. However, aircraft 101 is used merely for illustration purposes. It will be understood that composite materials manufactured using the embodiments disclosed herein may be used with any aircraft, including fixed wing, rotorcraft, commercial, military, or civilian aircraft, or any other non-aircraft structure requiring a hollow or tubular construction. Embodiments of the present disclosure are not limited to any particular setting or application, and embodiments can be used with a rotor system in any setting or application such as with other aircraft, vehicles, or equipment. Certain embodiments of the composite assemblies and methods of forming such disclosed herein may be used for any application involving a composite, aerodynamically shaped object. For example, some embodiments of the composite assemblies disclosed herein may be used for the rotors, propellers, wings, or control surfaces of an aircraft.

Aircraft 101 may include fuselage 102, landing gear 103, and wings 104. A propulsion system 105 is positioned on the ends of wings 104. Each propulsion system 105 includes an engine 106 and a proprotor 107 with a plurality of rotor blades 108. Engine 106 rotates proprotor 107 and blades 108. Proprotor 107 may include a control system for selectively controlling the pitch of each blade 108 to control the direction, thrust, and lift of aircraft 101. Although FIG. 1 shows aircraft 101 in a helicopter mode wherein proprotors 107 are positioned substantially vertical to provide a lifting thrust. It will be understood that in other embodiments, aircraft 101 may operate in an airplane mode wherein proprotors 107 are positioned substantially horizontal to provide a forward thrust. Proprotors 107 may also move between the vertical and horizontal positions during flight as aircraft 101 transitions between a helicopter mode and an airplane mode. Wings 104 may provide lift to aircraft 101 in certain flight modes (e.g., during forward flight) in addition to supporting propulsion systems 105. Control surfaces 109 on wing 104 and/or control surfaces 110 are used to adjust the attitude of aircraft 101 around the pitch, roll, and yaw axes while in airplane mode. Control surfaces 109 and 110 may be, for example, ailerons, flaps, slats, spoilers, elevators, or rudders. Wings 104, rotor blades 108, and/or control surfaces 109, 110 may be composite assemblies each comprising a spar and a set of upper and lower skins that extend along the spar. In some embodiments, the composite assemblies may have an upper core, a lower core, and a septum support layer extending between the upper and lower cores.

FIG. 2 is a perspective view of an exploded uncured composite assembly 201. In one embodiment, assembly 201 may be used to form the main rotor blades 108 of aircraft 101, for example. In another embodiment, assembly 201 may be used to form the wings 104 and/or control surfaces 109, 110 of aircraft 101. Composite assembly 201 generally comprises a plurality of details, such as a spar 202, a trailing-edge core 203, an upper skin 204, a lower skin 205, a leading-edge sheath 206, and an abrasion strip 207. The core and skin structures may be bonded or otherwise attached to the spar 202 to create a desired airfoil profile. For example, the blade components may be bonded together using layers of adhesive between each interface to form the final assembly 201.

Spar 202 itself may be a composite assembly, such as fabric layers or plies that are laid by hand to form a laminate stack and then cured using a resin that is applied to the dry plies after layup is complete. Spar 202 may have a central cavity 208 to create a hollow structure to reduce weight. Spar 201 may comprise two or more layers of uncured unidirectional laminate material. The plurality of unidirectional layers may be stacked or layered at varying angular directions relative to one another to achieve the desired strength and flexibility desired for the particular application. Each unidirectional layer is formed from fiberglass or carbon fiber composite material. However, in other embodiments the unidirectional layers may comprise other types of composite materials. In existing assemblies, spar 201 is manufactured as a single unit.

In embodiments of the disclosure, the design and manufacture of tubular composite bodies, such as spar 201, may be broken into two or more parts in order to simplify the manufacturing process and to minimize defects. The tubular composite bodies may be any symmetric and nonsymmetric tubular shape or composite body of revolution in which the full circumference design is divided into multiple pieces. When manufactured as a single composite tubular component having plies that are oriented at different angles in different layers, the difference in ply orientation can cause wrinkling and bunching (i.e., "finger-trapping effect") of the layers during cure.

In one embodiment, a multi-piece assembly for a complex composite tubular assembly or body of revolution is laid up in two or more separate pieces, which are individually cured prior to assembly of the final part. The benefits of such a manufacturing process include ease of the layup process, lack of a trapping condition exhibited in many tubular-shaped parts, time-consuming hot compactions are not needed, and common defects inherent to the legacy one-piece composite part manufacturing process are reduced. The finger-trapping effect, which commonly results in wrinkles in tubular composite assemblies due to the circumferential nature of the single-part layup, is non-existent in multi-piece assemblies since the composite fibers are not locked in place.

FIG. 3A illustrates two halves 301, 302 of a generally symmetrical tubular composite part. FIG. 3B illustrates the final tubular part 300 once the halves 301, 302 have been bonded together. Tubular composite part 300 is first laid up and cured in separate "C"-shaped halves 301, 302. Once the curing is complete, then the two halves 301, 302 are bonded together to form the final tubular-shaped part 300.

The final tubular part may be divided into any number of pieces. FIG. 4A illustrates three components 401, 402, 403 of an asymmetric tubular composite part. FIG. 4B illustrates the final tubular part 400 once the parts 401, 402, 403 have been bonded together. The shape and number of the component parts 401, 402, 403 are tailored depending upon the complexity of the geometry of the final part 400 and the requirements of each individual component part 401, 402, 403.

The component parts may be bonded together using adhesive and/or fasteners. The component parts may be constructed to enhance or otherwise support bonding together. For example, rather than having squared off edges, the edges 303 of component parts 301, 302 may have a shallow angle or draft that increase the overlapping area between the two parts in order to maximize the bonding surface area. Edges 303 are referred to herein as axial edges because they are oriented generally parallel to the axis of the spar. Depending upon the number of subparts and the precured details, the seams or bond lines could be located anywhere around the circumference of the final composite assembly.

Composite plies may be laid over the seams and cured to protect or hide the seam and/or to reinforce the bond between component parts. In another embodiment, torque-wrap plies 310 may be laid up around (i.e., outer wrap) and/or laid up inside (i.e., inner wrap) the final assembly of the component parts. The torque-wrap plies may be co-cured at the final assembly of the component parts An additional advantage of laying up separate component parts individually instead of laying up the entire tubular assembly is the ability to select inner or outer molds for each component part. When a tubular composite assembly is created as a single unit, the tool is typically used to form an inner surface on which the plies are laid up. However, when individual composite assembly components are created, each piece of the final tubular assembly can be formed using a tool that shapes either the inner or outer surface of that component. Moreover, one or more composite assembly components may be laid up on an inner mold tool and one or more other composite assembly components may be laid up on an outer mold tool. This allows for optimal tool selection for each component part. Each layer of plies may be formed from fiberglass, carbon fiber, or other composite materials or a combination of two or more materials.

In various embodiments, the plies used to create each of the composite assembly components may be laid up over a male tool and/or laid up inside a female tool. Alternatively, different composite assembly components for the same final tubular assembly may be laid up using both male and female tools. The selection of a tool for a composite assembly component is not available for existing tubular composite parts, which are typically laid up surrounding a male tool. The use of different mold tools in embodiments disclosed herein allows for optimized manufacturing of each composite assembly component.

Although the example illustrated in FIGS. 3A/B and 4A/B refer to construction of a spar, it will be understood that the disclosed composite manufacturing process can be used for any other tubular or conical aircraft components, such as a spindle, grip, cuff, and the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A device, comprising:
two or more cured composite components each having a component outer surface, the composite component parts bonded together to form a composite structure in which the component outer surface of each component forms at least a portion of an overall outer surface of the composite structure, wherein each of the cured composite assemblies do not have a tubular shape;
one or more composite torque-wrap plies laid up inside the composite components; and
one or more composite plies wrapped around the two or more cured composite components, wherein the one or more composite plies and an assembly of the two or more cured composite components have been co-cured using an adhesive agent.

2. The device of claim 1, wherein the composite structure forms a spar for an aerodynamic component.

3. The device of claim 1, wherein the two or more cured composite components comprise at least one of carbon and fiberglass composite materials.

4. The device of claim 1, wherein each of the cured composite components further comprise:
an aerodynamic component configured to be bonded to another of the cured composite components, and wherein at least one axial edge has a sloped shape.

5. The device of claim 4, further comprising:
an adhesive agent on the at least one axial edge for bonding the two cured composite components.

6. The device of claim 1, wherein each of the cured composite components further comprise:
at least one axial edge configured to be bonded to another of the cured composite components, and one or more fasteners attaching the axial edges of the at least two cured composite components.

7. The device of claim 1, further comprising:
one or more composite plies wrapped around an assembled and bonded two or more cured composite components.

8. A rotor blade for an aircraft, the rotor blade comprising:
two or more cured composite components each having a component outer surface, the composite component parts bonded together to form a composite structure in which the component outer surface of each component forms at least a portion of an overall outer surface of the composite structure, wherein each of the cured composite assemblies do not have a tubular shape;
one or more composite torque-wrap plies laid up inside the composite components; and
one or more composite plies wrapped around the two or more cured composite components, wherein the one or more composite plies and an assembly of the two or more cured composite components have been co-cured using an adhesive agent.

9. The rotor blade of claim 8, wherein the two or more cured composite components comprise at least one of carbon and fiberglass composite materials.

10. The rotor blade of claim 8, wherein each of the cured composite components further comprise:
an aerodynamic component configured to be bonded to another of the cured composite components, and wherein at least one axial edge has a sloped shape.

11. The rotor blade of claim 10, further comprising:
an adhesive agent on the at least one axial edge for bonding the two cured composite components.

12. The rotor blade of claim 8, wherein each of the cured composite components further comprise:
at least one axial edge configured to be bonded to another of the cured composite components, and one or more fasteners attaching the axial edges of the at least two cured composite component.

13. The rotor blade of claim 8, further comprising:
one or more composite plies wrapped around an assembled and bonded two or more cured composite components.

* * * * *